(12) United States Patent  
Sasaki

(10) Patent No.: US 9,365,792 B2  
(45) Date of Patent: Jun. 14, 2016

(54) COATING FILM FORMATION METHOD

(71) Applicant: HITACHI AUTOMOTIVE SYSTEMS, LTD., Hitachinaka-shi, Ibaraki (JP)

(72) Inventor: Masato Sasaki, Sagamihara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/428,445

(22) PCT Filed: Dec. 18, 2012

(86) PCT No.: PCT/JP2012/082765  
§ 371 (c)(1),  
(2) Date: Mar. 16, 2015

(87) PCT Pub. No.: WO2014/076848  
PCT Pub. Date: May 22, 2014

(65) Prior Publication Data  
US 2015/0240180 A1 Aug. 27, 2015

(30) Foreign Application Priority Data  
Nov. 16, 2012 (JP) ................ 2012-251789

(51) Int. Cl.  
*B05D 3/06* (2006.01)  
*C10M 111/04* (2006.01)  
*F02F 3/10* (2006.01)  
*F16J 1/04* (2006.01)  
*F16J 1/08* (2006.01)  
*C10M 169/04* (2006.01)

(52) U.S. Cl.  
CPC ........... *C10M 111/04* (2013.01); *C10M 169/04* (2013.01); *F02F 3/10* (2013.01); *F16J 1/04* (2013.01); *F16J 1/08* (2013.01); *C10M 2201/041* (2013.01); *C10M 2201/066* (2013.01); *C10M 2201/0663* (2013.01); *C10M 2209/1003* (2013.01); *C10M 2217/0443* (2013.01); *C10N 2230/06* (2013.01); *C10N 2230/12* (2013.01); *C10N 2240/10* (2013.01); *C10N 2250/08* (2013.01); *C10N 2250/14* (2013.01); *C10N 2250/141* (2013.01)

(58) Field of Classification Search  
USPC .................. 427/554, 555, 556, 557, 558, 559  
See application file for complete search history.

(56) References Cited

U.S. PATENT DOCUMENTS

2008/0060603 A1 3/2008 Kuroda et al.  
2009/0257696 A1* 10/2009 Leonardelli .......... C09D 179/08  
384/440

(Continued)

FOREIGN PATENT DOCUMENTS

JP 2006-055885 A 3/2006  
JP 2007-169754 A 7/2007

(Continued)

*Primary Examiner* — Dah-Wei D Yuan  
*Assistant Examiner* — Nga Leung V Law  
(74) *Attorney, Agent, or Firm* — Foley & Lardner LLP

(57) ABSTRACT

Aluminum alloy-made piston 1 is provided having, on external circumferential surfaces of both skirt portions 8, 9 of base member 1a, a multilayer solid lubricant coating film including inner coating film 21 and outer coating film 22. Both of the inner and outer coating films contain at least one of polyimide-imide resins, polyimide resins and epoxy resins as a binder resin. The inner coating film is formed of a material containing graphite etc. as a solid lubricant, and applied to the external surfaces of the skirt portions and then irradiated with laser beams by a laser heating apparatus at a temperature rise rate of 11.3-23.9° C./sec. for 10 seconds to be dried. Then, the outer coating film is applied to the top surface thereof, followed by baking treatment. With this, the multilayer solid lubricant coating film is formed in a possibly short total treatment time in a coating film-forming step.

14 Claims, 7 Drawing Sheets

(56) References Cited

U.S. PATENT DOCUMENTS

| | | | |
|---|---|---|---|
| 2010/0140880 A1* | 6/2010 | Hayashi | B05D 5/08 277/442 |
| 2010/0236516 A1* | 9/2010 | Sasaki | C10M 111/04 123/193.6 |
| 2012/0094018 A1* | 4/2012 | Landry-Coltrain | B41C 1/05 427/160 |

FOREIGN PATENT DOCUMENTS

| | | |
|---|---|---|
| JP | 2007-196279 A | 8/2007 |
| JP | 2008-056750 A | 3/2008 |
| JP | 2010-069394 A | 4/2010 |
| JP | 2010-216362 A | 9/2010 |

* cited by examiner

1 ··· PISTON
1a ··· PISTON BASE MEMBER
3 ··· CYLINDER WALL SURFACE
8 ··· THRUST-SIDE SKIRT PORTION
9 ··· COUNTERTHRUST-SIDE SKIRT PORTION
21 ··· INNER COATING FILM
22 ··· OUTER COATING FILM

COATING FILM FORMATION METHOD

TECHNICAL FIELD

The present invention relates to a method for forming a multilayer solid lubricant coating film on, for example, the surface of a skirt portion of a piston of internal combustion engines.

BACKGROUND OF THE INVENTION

As is generally known, various techniques have been proposed for improving wear resistance and seize resistance by forming a multilayer solid lubricant coating film on the surface of sliding members such as a skirt portion of pistons of automotive internal combustion engines.

As one example of those, the following Patent Publication 1, which has previously been filed by the applicant, discloses a technique of forming a solid lubricant coating film small in wear amount as an inner layer while forming a solid lubricant coating film large in wear amount as an outer layer thereby reducing unevenness of streaks remaining on the surface of a skirt portion to lower the friction between the skirt portion and a cylinder wall surface.

REFERENCES ABOUT PRIOR ART

Patent Documents

Patent Publication 1: Japanese Patent Application Publication No. 2010-216362

SUMMARY OF THE INVENTION

Problems to be Solved by the Invention

In order to form a multilayer solid lubricant coating film like the technique described in Patent Publication 1, however, it is necessary to repeat treatments such as drying and baking on every solid lubricant coating film. As a result, it is necessary to have a long treatment time in total for forming a multilayer solid lubricant coating film. This makes the production operation cumbersome and causes an adverse effect on the cost.

It is therefore an object of the present invention to provide a method for forming a multilayer solid lubricant coating film where a total treatment time in a coating film-forming step is as short as possible.

Means for Solving the Problems

The invention claimed in claim 1 is a method for forming a multilayer solid lubricant coating film on an external surface of a skirt portion of a piston in an internal combustion engine, characterized by comprising the steps of: preparing an inner solid lubricant coating film from a material containing at least graphite; applying the inner solid lubricant coating film on the external surface of the skirt portion, followed by irradiating the film with a laser beam to dry the film; and applying an outermost layer solid lubricant coating film, followed by conducting a baking treatment thereon.

Effects of the Invention

According to the present invention, a multilayer solid lubricant coating film where a total treatment time in a coating film-forming step is as short as possible.

MODE(S) FOR CARRYING OUT THE INVENTION

Referring now to the accompanying drawings, an embodiment where the coating film formation method according to the present invention is applied to a piston of an internal combustion engine will be discussed in detail. Incidentally, the piston in this embodiment is for use in a four-cycle gasoline engine.

Figure 2:
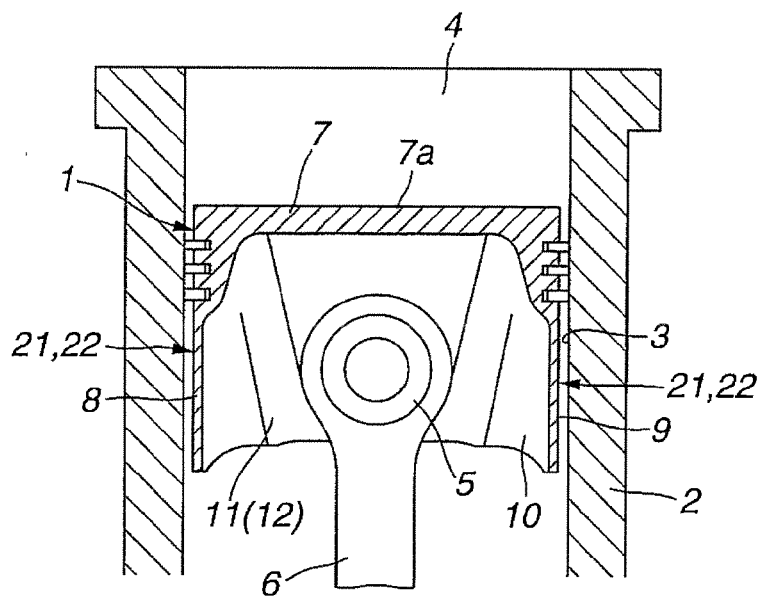
FIG. 2 A front, partially sectional view of the piston in a sliding movement against a cylinder wall surface.

As shown in FIG. 2, the piston 1 is slidably mounted on a substantially cylindrical cylinder wall surface 3 of the cylinder block 2, and provided to define a combustion chamber 4 between the cylinder wall surface and a cylinder head (though not shown) and connected to a crankshaft (though not shown) through a piston pin 5 and a connecting rod 6 connected thereto.

Figure 1:
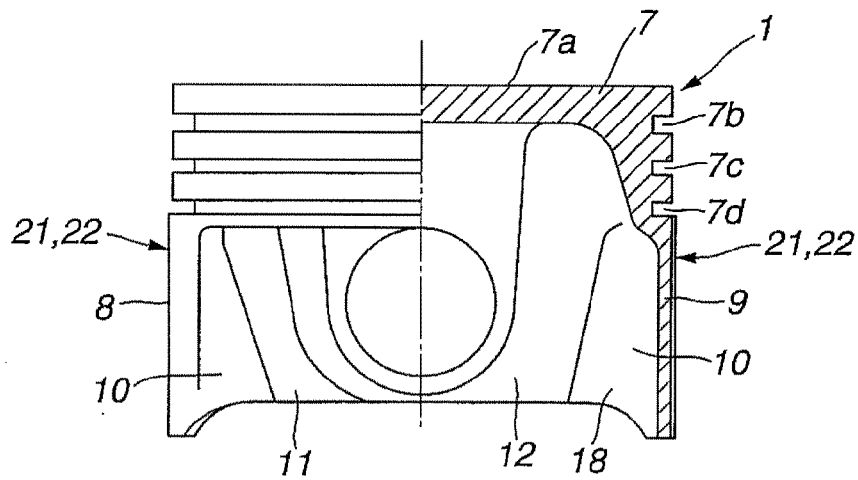
FIG. 1 A half, vertical sectional view of a piston of an internal combustion engine that has been prepared in accordance with the coating film formation method of the present invention.
Figure 7:
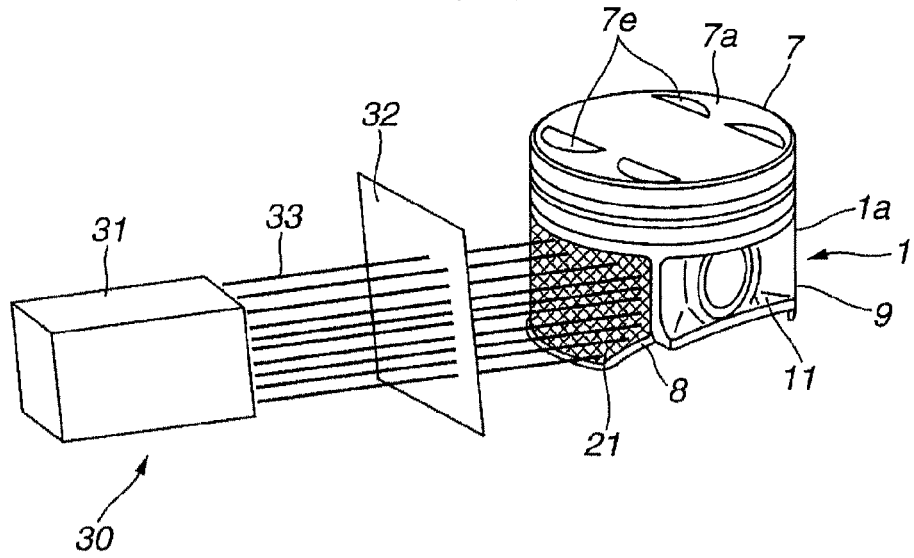
FIG. 7 A schematic view showing a state where a laser beam is applied to an inner coating film formed on the surface of a piston by using a laser heating device, in accordance with the coating film formation method of a first embodiment of the present invention.

As shown in FIGS. 1, 2 and 7, the piston 1 has its entire body formed in one piece by forging aluminum alloy, e.g., Al—Si alloy AC8A, and shaped like a cylinder including: a crown portion 7 (which has a top surface 7a above which the combustion chamber 4 is defined); a pair of arc-shaped thrust-side and counterthrust-side skirt portions 8, 9 which are formed integrally with a bottom edge of the outer circumferential edge of the crown portion 7; and a pair of apron portions 11, 12 which are circumferentially connected to the opposite sides of the skirt portions 8, 9, respectively, through connection parts 10.

The crown portion 7 has a substantially disc-like shape with a relatively large thickness, and includes a valve recess 7e for avoiding interference with engine intake and exhaust valves on the top surface 7a, and includes at its outer circumferential surface ring grooves 7b, 7c, 7d for holding therein three piston rings such as pressure ring, oil ring, etc.

The skirt portions 8, 9 are located symmetrical with respect to the axis of the piston 1 and each has a substantially arc-shaped cross section with a relatively small thickness throughout almost its entirety. The thrust-side skirt portion 8 is adapted to, when the piston 1 moves down to the bottom dead center during an expansion stroke, incline toward and come in contact with pressure to the cylinder wall surface 3 due to the angular positional relationship with the connecting rod 6. On the other hand, the counterthrust-side skirt portion 9 is adapted to, when the piston 1 moves up to the top dead center during a compression stroke, incline toward and come in contact with pressure to a counterthrust side of the cylinder wall surface 3. The thrust-side skirt portion 8, which is adapted to come into contact with pressure to the cylinder wall surface 3 under the influence of a combustion pressure, is superior to the counterthrust-side skirt portion 9 in contact pressure load to be imposed on the cylinder wall surface 3.

Figure 3:
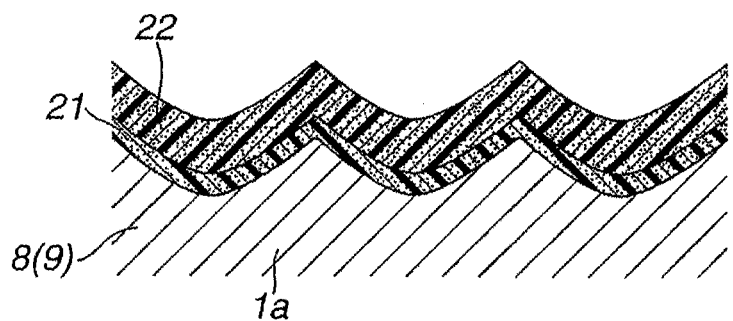
FIG. 3 An enlarged sectional view showing an inner solid lubricant coating film and an outer solid lubricant coating film.

As shown in FIGS. 1 and 3, a double-layer solid lubricant coating film is formed on the thrust-side skirt portion 8 and the counterthrust-side skirt portion 9 of the piston 1.

That is, this double-layer solid lubricant coating film is provided to include an inner coating film (a first solid lubricant coating film) 21 and an outer coating film (a second solid lubricant coating film) 22. As a resin for binding them, there is used one or two kinds of binder resins superior in heat resistance, wear resistance and adhesion, such as epoxy resins, polyimide resins and polyamide-imide resins.

Concretely speaking, the outer coating film 22 is provided to contain as a binder resin any one of epoxy resins, polyimide resins and polyamide-imide resins in an amount of 5 to 50 wt % and provided to contain molybdenum disulfide (M) as a solid lubricant in an amount of 50 to 95 wt %.

If the content of the binder resin is less than 5 wt %, its adhesion to the inner coating film 21 may lower due to a reduction of binding force. On the contrary; if it is greater than 50 wt %, the content of the solid lubricant is to be relatively decreased, so that the initial adaptability may become inferior.

The inner coating film 21 is provided to contain 50 wt % or more of one of the same binder resins as the outer coating film 22 may contain, while being provided to contain one or more kinds of molybdenum disulfide (M), graphite (G) and carbon black (B) as a basic solid lubricant in an amount of less than 50 wt %.

Figure 4:
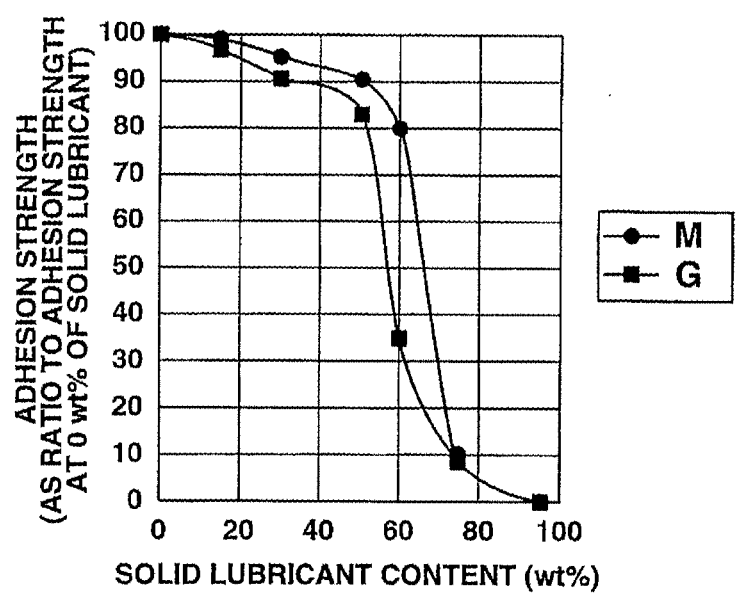
FIG. 4 A characteristic diagram showing the relationship between the content of a solid lubricant and the strength of adhesion.

If the content of the binder resin is less than 50 wt % in the inner coating film 21, adhesion to a piston base member 1a may lower. It can be understood from FIG. 4 (that shows the change of adhesion by adding its solid lubricant, e.g., graphite (G) and molybdenum disulfide (M)) to the binder resin) that adhesion is drastically decreased as the content of the solid lubricant exceeds 50 wt %, that is, as the content of the binder resin becomes less than 50 wt %.

Thus, the inner coating film 21 has a function of securing adhesion to the piston base member 1a and adhesion to the outer coating film 22.

Therefore, the inner coating film 21 is not required to contain a large amount of the solid lubricant, but it is allowed to add the solid lubricant to such an extent that adhesion is secured, thereby improving characteristics of the coating film.

When the content of the molybdenum disulfide (M) as the solid lubricant is less than 5 wt %, seize resistance may be lowered. If it is greater than 20 wt %, the strength of the coating film may be reduced, with which the wear amount may become increased.

Furthermore, if molybdenum disulfide (M) is used as the solid lubricant, seize resistance may be improved by a synergy effect with graphite.

Concerning the inner coating film 21, it is therefore possible to use molybdenum disulfide (M) and graphite (G) in combination as the solid lubricant. In this case, it is preferable that the total content of molybdenum disulfide (M) and graphite (G) is 5 to 20 wt %, and that the content of molybdenum disulfide is 1 to 10 wt %.

The reason of this is that it may be difficult to sufficiently improve seize resistance by the combined use if molybdenum disulfide (M) is less than 1 wt %, and that wear resistance may become reduced if it is greater than 10 wt %.

The outer coating film 22 is provided to contain 50-95 wt % of the solid lubricant including molybdenum disulfide (M) and the like; this is because a content of less than 50 wt % reduces the initial adaptability while that of more than 95 wt % decreases the content of the binder resin to less than 5 wt %, thereby causing a reduction of binding force so as to lower its adhesion to the inner coating film 21.

Each of the outer and inner coating films 22, 21 may be prepared, for example, by mixing an organic solvent with the binder resin (i.e., an epoxy resin, a polyimide resin or a polyamide-imide resin), followed by adding the solid lubricant to the thus prepared resin solution. According to need, hard particles may be added thereto and mixed and dispersed by using a bead mill or the like.

Incidentally, the contents of the binder resin and the solid lubricant (e.g., molybdenum disulfide (M) and graphite (G)) are arranged to be 100 wt % in total.

According to need, the solid lubricant coating film of the present invention may be diluted with an organic solvent and may be applied to the piston base member 1a as a paint.

More specifically, the inner coating film 21 and the outer coating film 22 are, in order, applied onto the external circumferential surfaces of the thrust-side skirt portion and the counterthrust-side skirt portion of the piston base member 1a and then dried and baked for cure, thereby obtaining a double-layer solid lubricant coating film.

The above-mentioned organic solvent used for the dilution is not particularly limited as long as it can dissolve the binder resin therein, even if it is a solvent-based one.

The baking conditions, such as baking temperature and baking time, may suitably be determined. Since the baking can be conducted at a temperature of 200° C. or lower, it is also applicable to a piston 1 formed of an aluminum alloy.

Though the thickness of each of the inner and outer coating films 21, 22 may suitably be determined, it is preferably around 5-40 μm in view of operability, cost, etc. of the application.

[Coating Film Formation Method]

Figure 5:
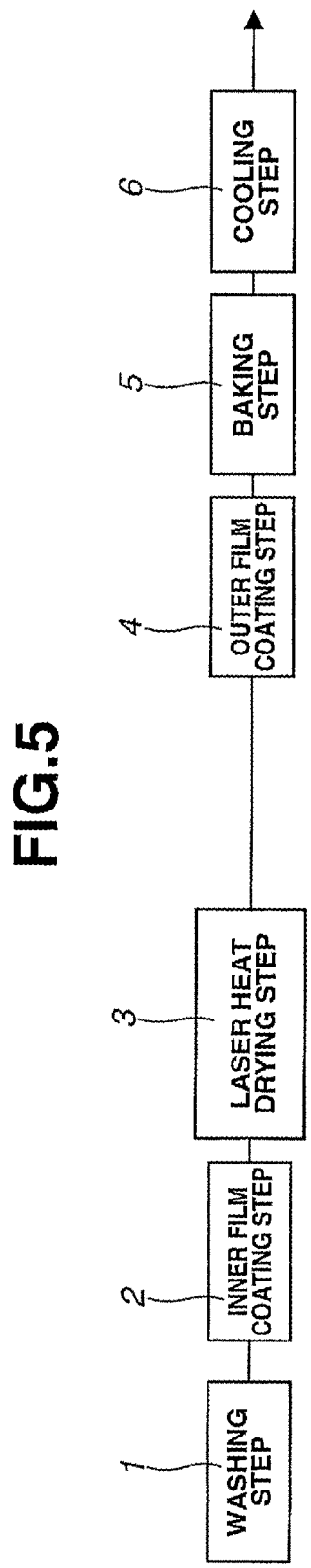
FIG. 5 A block diagram showing steps for forming an inner coating film and an outer coating film, according to the coating film formation method of the present invention.

With reference to FIG. 5, there will be concretely explained a method for forming the inner coating film 21 and the outer coating film 22 on the surface of the skirt portions 8, 9 of the piston base member 1a, as follows.

Firstly, the surface of the piston base member 1a is subjected to a pretreatment, such as solvent degreasing and alkali degreasing, to remove oils and stains (Washing Step 1).

Then, the surface of the piston base member 1a is coated with the inner coating film 21 having the above-mentioned composition, by a known method such as screen printing (Inner Film Coating Step 2).

Then, the inner coating film is brought into a step of being dried by heating. In this drying step, drying is conducted by heating by a laser beam using a laser heating apparatus 30 as described later (Laser Heat Drying Step 3). With this, an organic solvent can be removed.

Then, the outer coating film 22 having the above-mentioned composition is applied onto the top surface of the inner coating film 21, by a known method such as screen printing, similarly to the case of the inner coating film 21 (Outer Film Coating Step 4).

Then, the outer coating film 22 is subjected to a drying/baking treatment by using a known apparatus such as a continuous heating furnace under conditions of 180° C. for 30 minutes or 200° C. for 20 minutes, for example (Baking Step 5).

Then, the piston base member 1a on which the inner coating film 21 and the outer coating film 22 are baked is cooled as a whole by a cooling apparatus (Cooling Step 6).

With this, the steps for forming the inner coating film 21 and the outer coating film 22 in series are completed.

In this embodiment of the present invention, the drying step of the inner coating film 21 is conducted by the laser beam using the laser heating apparatus 30. In contrast, according to conventional techniques, this drying step has been conducted, for example, by using a continuous heating furnace, not by using a laser beam.

Figure 6:
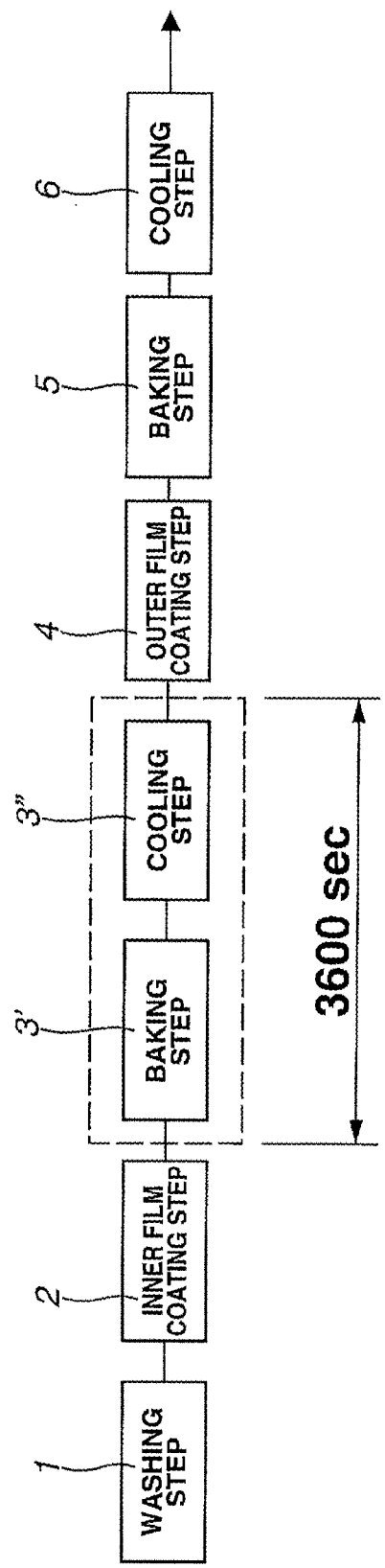
FIG. 6 A block diagram showing steps for forming an inner coating film and an outer coating film, according to a conventional coating film formation method.

In fact, according to conventional techniques, as shown in FIG. 6, Washing Step 1, Inner Film Coating Step 2, Outer Film Coating Step 4, Baking Step 5, and Cooling Step 6 are conducted in the same manner as those of the present embodiment; however, the drying step has been conducted by a drying/baking treatment using, for example, a continuous heating furnace (Baking Step 3'), followed by cooling the piston base member 1a as a whole by a cooling apparatus (Cooling Step 3"). It has been necessary in conventional techniques to spend a long period of time of about 3,600 seconds, that is, about one hour in total, for conducting Baking Step 3' and Cooling Step 3".

In contrast, in this embodiment of the present invention, a continuous heating furnace, an infrared heating apparatus or the like of conventional techniques is not used, but a laser heating apparatus 30 as shown in FIG. 7 is used for heating and drying the inner coating film 21. Therefore, it is possible to conduct this treatment in an extremely short period of time of about 10 seconds.

Concretely speaking, apparatuses disclosed, for example, in Japanese Patent Application Publications Nos. 2006-55885 and 2007-196279 are usable as the laser heating apparatus 30. The laser heating apparatus 30 is, as shown in FIG. 7, constituted mainly of a laser oscillator 31, and a glass-made diffusion panel 32 interposed between the laser oscillator 31 and the piston base member 1a.

The laser oscillator 31 is formed by stacking a plurality of laser diode bars and adapted to apply parallel laser beams 33 of a single bundle in a diametral direction onto the inner coating film 21 formed on the curved external surfaces of the skirt portions 8, 9.

Figure 8:
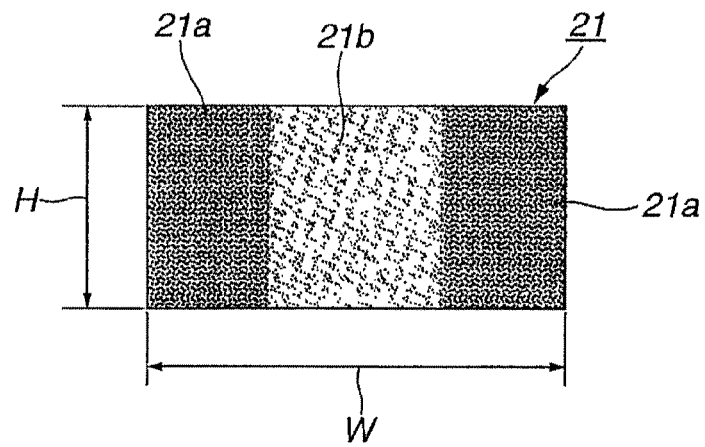
FIG. 8 A distribution diagram of the energy density of the laser beam on the inner coating film, according to the present embodiment of the coating film formation method.

The glass-made diffusion panel 32 scatters the laser beams 33 at a suitable degree in order to make the energy density more uniform on the inner coating film 21 as a whole. As shown in FIG. 8, the inner coating film 21 has left and right regions 21a, 21a in the width W, in which regions the output energy density is set to be high. Meanwhile, the output energy density of a central region 21b is set to be lower than those of the left and right regions 21a, 21a. In other words, since heat radiation from the piston base member 1a made of an aluminum alloy is high in the left and right regions 21a, 21a, the energy density of the laser beams 33 is set to be high. In contrast, since heat radiation from the piston base member 1a is low in the central region 21b, the energy density of the laser beams 33 is set to be low. With this, the heating temperature on the entire surface of the inner coating film 21 is made uniform.

TABLE 1

| No. | Graphite (G) (wt %) | Carbon black (B) (wt %) | Molybdenum disulfide (M) (wt %) | Polyamide-imide (wt %) | Drying time (sec) 30 W/cm$^2$ | G + B + 0.46 × M (wt %) | Remarks |
|---|---|---|---|---|---|---|---|
| 1 | 0 | 0 | 0 | 100 | — | 0 | Drying was not conducted |
| 2 | 5 | 0 | 0 | 95 | 18 | 5 | |
| 3 | 10 | 0 | 0 | 90 | 13 | 10 | |
| 4 | 15 | 0 | 0 | 85 | 10 | 15 | |
| 5 | 20 | 0 | 0 | 80 | 10 | 20 | |
| 6 | 30 | 0 | 0 | 70 | 10 | 30 | |
| 7 | 40 | 0 | 0 | 60 | 9 | 40 | |
| 8 | 50 | 0 | 0 | 50 | 9 | 50 | |
| 9 | 60 | 0 | 0 | 40 | 8 | 60 | Adhesion was not enough with single layer |
| 10 | 0 | 2 | 0 | 98 | 33 | 2 | |
| 11 | 0 | 5 | 0 | 95 | 20 | 5 | |
| 12 | 0 | 10 | 0 | 90 | 11 | 10 | |
| 13 | 0 | 15 | 0 | 85 | 9 | 15 | |
| 14 | 0 | 20 | 0 | 60 | 10 | 20 | |
| 15 | 0 | 0 | 10 | 90 | 14 | 5 | |
| 16 | 0 | 0 | 20 | 80 | 12 | 9 | |
| 17 | 0 | 0 | 30 | 70 | 10 | 14 | |
| 18 | 0 | 0 | 40 | 60 | 9 | 18 | |
| 19 | 0 | 0 | 50 | 50 | 9 | 23 | Adhesion was not enough with single layer. Therefore it was provided as outer layer of multilayer film. |
| 20 | 0 | 0 | 60 | 40 | 9 | 28 | Adhesion was not enough with single layer. Therefore it was provided as outer layer of multilayer film. |
| 21 | 0 | 0 | 70 | 30 | 8 | 32 | Adhesion was not enough with single layer. Therefore it was provided as outer layer of multilayer film. |
| 22 | 0 | 0 | 80 | 20 | 7 | 37 | Adhesion was not enough with single layer. Therefore it was provided as outer layer of multilayer film. |

TABLE 1-continued

| No. | Graphite (G) (wt %) | Carbon black (B) (wt %) | Molybdenum disulfide (M) (wt %) | Polyamide-imide (wt %) | Drying time (sec) 30 W/cm² | G + B + 0.46 × M (wt %) | Remarks |
|---|---|---|---|---|---|---|---|
| 23 | 0 | 0 | 90 | 10 | 8 | 41 | Adhesion was not enough with single layer. Therefore it was provided as outer layer of multilayer film. |
| 24 | 0 | 0 | 95 | 5 | 8 | 44 | Adhesion was not enough with single layer. Therefore it was provided as outer layer of multilayer film. |
| 25 | 15 | 0 | 30 | 55 | 8 | 29 | |
| 26 | 5 | 0 | 30 | 65 | 8 | 19 | |
| 27 | 15 | 0 | 20 | 65 | 8 | 24 | |
| 28 | 10 | 0 | 20 | 70 | 9 | 19 | |
| 29 | 5 | 0 | 25 | 70 | 9 | 17 | |
| 30 | 10 | 0 | 10 | 80 | 9 | 15 | |
| 31 | 5 | 0 | 15 | 80 | 10 | 12 | |
| 32 | 5 | 0 | 10 | 85 | 12 | 10 | |
| 33 | 5 | 0 | 5 | 90 | 15 | 7 | |
| 34 | 0 | 5 | 10 | 85 | 11 | 10 | |

Table 1 shows experimental results for verifying drying times (second), which were obtained by irradiating the lower coating film 21 with laser beams 33 having an energy density of 30 W/cm² with use of the laser heating apparatus 30 under conditions where the contents of black-color solid lubricants (such as graphite (G), carbon black (B) and molybdenum disulfide (M)) and the content of a polyamide-imide as the binder resin were changed.

Table 1 indicates solid contents (the binder resin and the solid lubricant) only, but in fact, the paint also contained 30 to 70 wt % of a solvent. This solvent was N-methylpyrrolidone.

As shown in Table 1, the test sample No. 1 means a case of having used a polyamide-imide (i.e., the binder resin) only, in which case drying was not performed.

The test samples Nos. 2 and 3 refer to cases of having set the content of graphite (G) to 5 or 10 wt % and having set the content of a polyaraide-imide to 95 or 90 wt %, in which cases the drying times were 10 seconds or longer (more specifically, the drying times were 18 seconds and 13 seconds).

The test samples Nos. 10 to 12 refer to cases of having set the content of carbon black (B) to 2 wt %, 5 wt % and 10 wt %, respectively, and having adapted the content of a polyamide-imide to correspond therewith. In these cases also, the drying times were 10 seconds or longer (more specifically, the drying times were 33 seconds, 20 seconds and 11 seconds).

The test samples Nos. 15 and 16 refer to cases of having set the content of molybdenum disulfide to 10 wt % and 20 wt %, respectively, and having adapted the content of a polyamide-imide to correspond therewith. In these cases also, the drying times were 14 seconds and 12 seconds.

The test samples Nos. 32 to 34 refer to cases of having set the content of graphite (G) to 5 wt %, 5 wt % and 0 wt %, respectively, and having set the content of molybdenum disulfide (M) to 10 wt %, 5 wt % and 10 wt %, respectively, and having adapted the content of a polyamide-imide to correspond therewith. In these cases also, the drying times were 12 seconds, 15 seconds and 11 seconds.

On the contrary, in the test samples Nos. 4 to 9 referring to cases of having set the content of graphite (G) to 15-60 wt % and having adapted the content of a polyamide-imide to correspond therewith, the drying times of the lower coating film 21 were 8 to 10 seconds. Additionally, the test samples Nos. 13 and 14 refer to cases of having set the content of carbon black (B) to 15 wt % and 20 wt %, in which cases also the drying times were 8 seconds and 10 seconds.

Furthermore, the test samples Nos. 17 to 31 refer to cases of having set the content of molybdenum disulfide (M) to 10-95 wt %, in which cases the drying times were apparently 7 to 10 seconds.

The laser beams 33 are absorbed by a black-color component such as graphite (G), molybdenum disulfide (M) and carbon black (B), and thereby graphite (G), molybdenum disulfide (M), carbon black (B) and the like generate heat.

Absorption of the laser beams 33 is in correlation with the volume percentage of the above-mentioned component such as graphite (G) in the coating film. Hence absorption becomes increased as the volume percentage becomes larger. However, as this volume percentage exceeds a certain level, absorption of the laser beams 33 becomes constant. This is because the surface area to which the laser beams 33 is applied and in which absorption becomes increased with increase of the ratio covered with these components is fully covered with these components at the certain level.

Each of graphite (G) and carbon black (B) has a density of 2.2, and molybdenum disulfide (M) has a density of 4.8. Accordingly, the weight percentage of molybdenum disulfide (M) multiplied by 0.46 (=2.2/4.8) becomes equivalent with that of graphite (G) or carbon black (B).

Figure 9:
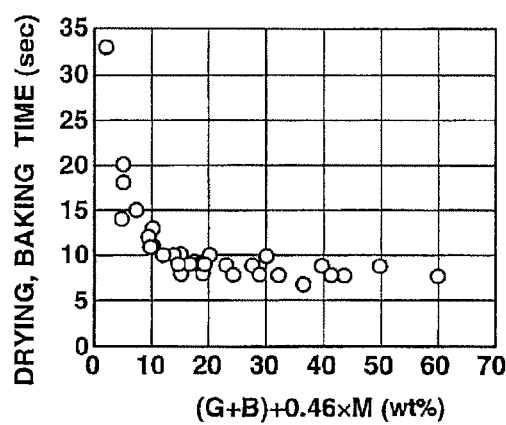
FIG. 9 A graph showing experimental results on the relationship between the weight percentage of the solid lubricant and the drying or baking time.

As shown in FIG. 9 that indicates "G+B+0.46×M" as an index, the drying time is 10 seconds or shorter if the index of "G+B+0.46×M" is 12 wt % or greater.

Additionally, if the index of "G+B+0.46×M" is greater than 50 wt adhesion to the piston formed of alloy material become inferior.

Therefore, it is possible to adjust the drying time to 10 seconds or shorter, if the solid lubricant has a composition meeting the index of "G+B+0.46×M" of not smaller than 12 wt % and the index of "G+B+0.46×M" of not larger than 50 wt %.

In order to determine the output energy density of the laser beams 33, a paint having a composition of the test sample No. 6 as shown in Table 1 (containing 30 wt % of graphite (G) and 70 wt % of a polyamide-imide that serves as the binder resin) was applied onto the surface of the skirt portion 8 to have a film thickness of 30 μm. Then, the film was irradiated with the laser beams 33 at various output energy densities for 10 seconds. During this irradiation, the surface temperature was measured by a thermoviewer.

TABLE 2

| Temperature rise rate (° C./sec.) | Condition of coating film after 10 sec. |
|---|---|
| 8.3 | Partly not dried |
| 9.5 | Partly not dried |
| 10.1 | Partly not dried |
| 11.3 | Dried |

TABLE 2-continued

| Temperature rise rate (° C./sec.) | Condition of coating film after 10 sec. |
|---|---|
| 12.2 | Dried |
| 12.3 | Dried |
| 13.3 | Dried |
| 13.9 | Dried |
| 15.1 | Dried |
| 16.1 | Dried |
| 17.2 | Dried |
| 18.5 | Dried |
| 19.5 | Dried |
| 20.5 | Dried |
| 21.3 | Dried |
| 22.7 | Dried |
| 23.9 | Dried |
| 24.8 | Bumping and burning |
| 26.1 | Bumping and burning |
| 27.3 | Bumping and burning |

Experimental results thereof are summarized in Table 2. From these experimental results, it was found that drying of the film was completed when the temperature reached 113 to 239° C., irrespective of the degree of the output energy density and the thickness of the piston part to which the paint was applied. It is therefore necessary for drying the paint in 10 seconds to heat it at a temperature rise rate of 11.3 to 23.9° C./second.

When the temperature rise rate was less than 11.3° C./seconds, the film was partly not dried. When it exceeds 23.9° C./seconds, the solvent evaporated abruptly during the temperature rise step, thereby generating swelling of the inner coating film 21. At last, there was a burning risk of the solvent. Thus, it was not possible to obtain a robust film.

Therefore, it can be found from these experimental results that it is possible to suitably dry the inner coating film 21 by the irradiation for 10 seconds with the laser beams 33 when the output energy density of the laser beams 33 is adjusted within a range of 11.3-23.9° C./seconds of temperature rise rate.

As mentioned above, in this embodiment the inner coating film 21 formed on each of the skirt portions 8, 9 of the piston base member 1a is dried by using the laser heating apparatus 30. With this, it becomes possible to conduct the drying treatment with an extremely short period of drying time of 10 seconds or shorter.

As a result, it becomes possible to perform the whole steps for forming the coating film with a shorter period of time than that of conventional techniques. With this, it is possible to improve the efficiency of the production operation and greatly reduce the production cost.

Furthermore, as mentioned above, the inner coating film 21 is obtained by directly heating the solid lubricant coating film (e.g., graphite (G)) by the laser beams 33. Accordingly, the temperature rise of the piston base member 1a itself is very limited. Therefore, it is not necessary to conduct cooling after the drying and install a cooling apparatus. With this, it is possible to further shorten the period of treatment time for forming a coating film and further reduce the production cost.

Furthermore, according to the present embodiment, the inner coating film 21 is superior in adhesion to the piston base member 1a. Additionally, the outer coating film 22 is provided to contain 50-95 wt % of the solid lubricant (i.e., at least molybdenum disulfide (M)) thereby exhibiting an excellent initial adaptability at the time when the external circumferential surfaces of the thrust-side and counterthrust-side skirt portions 8, 9 of the piston 1 are slidably moved against the cylinder wall surface 3. In other words, the surface of the outer coating film 22 wears in a short period of time to quickly form a smooth sliding surface thereon, which means that it is possible to swiftly obtain a superior initial adaptability.

Second Embodiment

Figure 10:
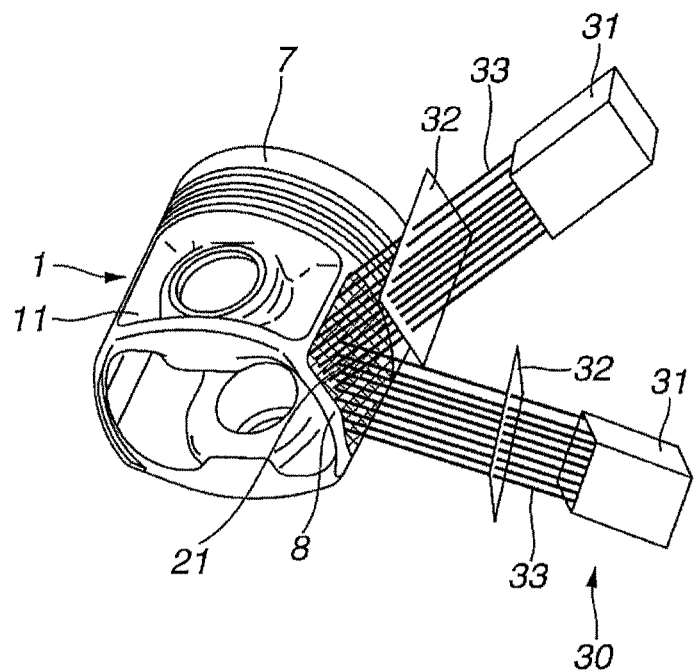
FIG. 10 A schematic view showing a state where a laser beam is applied to an inner coating film formed on the surface of a piston by using a laser heating device, in accordance with the coating film formation method of a second embodiment.

FIG. 10 shows a second embodiment of the present invention, wherein a laser heating apparatus 30 is constituted of two laser oscillators 31, 31, and glass-made diffusion panels 32, 32 interposed between the laser oscillators 31, 31 and the skirt portions 8, 9, respectively.

The two laser oscillators 31, 31 are disposed on both side of the width direction of an inner coating film 21 formed on the skirt portions 8, 9 of the piston base member 1a. Each of the skirt portions 8, 9 is irradiated with laser beams 33, 33 from the diametral direction of the piston base member 1a at left and right regions 21a, 21a of the inner coating film 21. The laser beams 33, 33 are arranged to be applied to a central region 21b so as not to overlap with each other.

With this, in the inner coating film 21, the left and right regions 21a, 21a larger in heat radiation than that of the central region 21b becomes higher in energy density of the laser beams 33, 33 than that of the central region 21b. Hence the energy density against the entire of the inner coating film 21 is made uniform.

Third Embodiment

Figure 11:
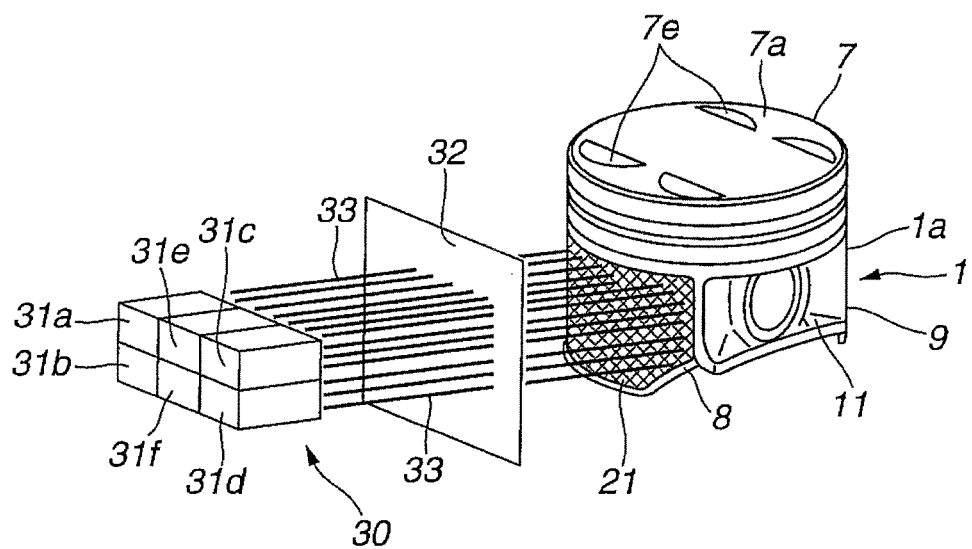
FIG. 11 A schematic view showing a state where a laser beam is applied to an inner coating film formed on the surface of a piston by using a laser heating device, in accordance with the coating film formation method of a third embodiment.

FIG. 11 shows a third embodiment of the present invention, wherein a laser heating apparatus 30 is constituted of six laser oscillators. One glass-made diffusion panel 32 is disposed between the laser oscillators 31a to 31f and the skirt portions 8, 9.

The above-mentioned six laser oscillators 31a to 31f are disposed such that three oscillators arranged along the width direction of the inner coating film 21 (formed on the skirt portions 8,9 of the piston base member 1a) are vertically adjacent to each other. The inner coating film 21 is irradiated with laser beams 33 from the diametral direction of the piston base member 1a at left and right regions 21a, 21a', 21c, 21c' and at central regions 21b, 21b'. The laser beams 33 are so arranged as not to overlap with each other.

Figure 12:
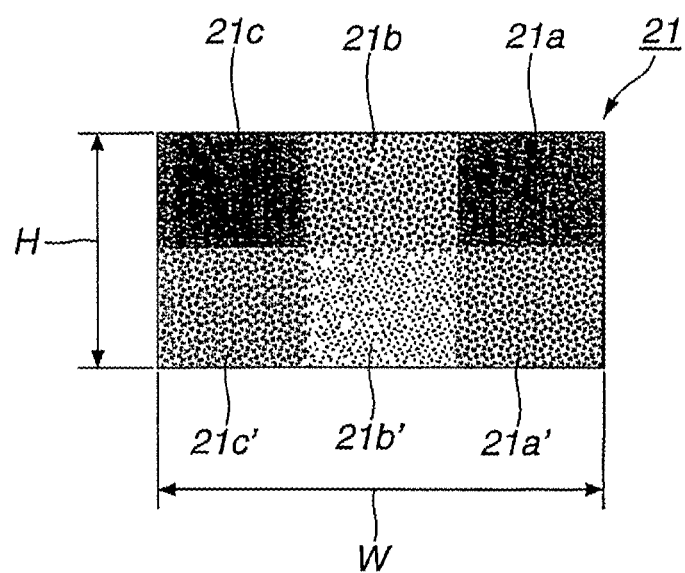
FIG. 12 A distribution diagram of the energy density of the laser beam on the inner coating film, according to the present embodiment of the coating film formation method.

In other words, as shown in FIG. 12, the whole area of the inner coating film 21 is divided into six regions, and the output energy density of the left and right regions 21a, 21a', 21c, 21c' is set to be higher than that of the central regions 21b, 21b'. More specifically, as described in the first embodiment, the left and right regions 21a, 21a', 21c, 21c' are high in terms of heat radiation from a pair of apron portions 11, 12 of the piston base member formed of aluminum alloy, and therefore laser beams 33 emitted from four laser oscillators 31a to 31d are adapted to be increased in energy density. Meanwhile, the central regions 21b, 21b' are low in heat radiation and therefore laser beams 33 emitted from two central laser oscillators 31e, 31f are adapted to be decreased in energy density. With this, the heated temperature of the inner coating film 21 is made uniform as a whole.

Furthermore, the output energy density of regions 21a, 21b, 21c, which are located on the side of crown portion 7, is set to be higher than that of regions 21a', 21b', 21c' located on the side of a crankshaft.

That is, since the regions 21a, 21b, 21c located on the side of crown portion 7 are high in heat radiation from the crown portion 7, the energy density of the laser beams emitted from the three laser oscillators 31a, 31b, 31c located on the side of the crown portion 7 is set to be high. On the contrary, the regions located on the side of a crankshaft are low in heat radiation, so that the energy density of the laser beams emitted from the crankshaft-side three laser oscillators 31b, 31f, 31d is set to be lower than that of the side of the crown portion 7. With this, the heated temperature of the inner coating film 21 is made uniform as a whole. In other words, in this embodiment, it is required only to increase the energy density of each of the six laser oscillators 31a to 31f as heat capacity of a corresponding region of the skirt portions 8,9 is increased. Hence the number of the laser oscillators, the dimension of one region irradiated by one laser oscillator, and the like may suitably be modified according to conditions.

The present invention is not limited to the above-mentioned embodiments; for example, it may be performed by drying the inner coating film 21 with the irradiation of the laser beams 33 at a temperature rise rate of 11.3-23.9° C./second for 10 seconds or shorter and then by conducting a baking treatment with a further increased energy density.

Moreover, heating after drying does not generate swelling (which should be caused at the drying), so that it is possible to perform heating at a higher temperature rise rate than that in the drying operation. More specifically, the degree of baking is determined by a temperature attained after the inner coating film is subjected to drying and then a 10 seconds of heating. The degree of achievement of baking is confirmed by an adhesion test. In this test, the inner coating film is provided with a cross cut and immersed in a 80° C. hot water for 200 hours and then subjected to a tape peel test to obtain a peeled area.

TABLE 3

| Finally attained temperature (° C.) | Peeled area (%) (Results of adhesion test) |
| --- | --- |
| 180 | 100 |
| 190 | 70 |
| 200 | 50 |
| 210 | 15 |
| 220 | 2 |
| 230 | 0 |
| 240 | 0 |
| 250 | 0 |
| 260 | 0 |
| 270 | 0 |
| 280 | 0 |
| 290 | 0 |
| 300 | 0 |
| 310 | 0 |
| 320 | 0 |
| 330 | 0 |
| 340 | 0 |
| 350 | 0 |
| 360 | Piston alloy was softened |
| 370 | Piston alloy was softened |

FIG. 3 shows results of the test. According to these results, it can be found that a sufficient adhesion is obtained when the temperature attains 230° C. or greater.

In the above-mentioned embodiments, one, two or six laser oscillators 31 were used; however, from the fact that the smaller number of the laser oscillators 31 makes it more difficult to uniform the temperature, it is also feasible to perform a local air cooling inside the skirt portions 8, 9 of the piston 1 to make the temperature uniform.

Moreover, the solid lubricant coating film is not limited to a double-layer structure and therefore it may have two or more layers.

The solid lubricant coating film according to the present invention is fit for a wide range of uses in sliding members under oil lubrication conditions and under dry lubrication conditions. Epoxy resins, polyimide resins and polyamide-imide resins, which are used as the binder resin in the multilayer coating film, are excellent in adhesion so as not to restrict a base material. For example, these resins may be applied to base materials such as cast iron, steel and copper alloy, in place of various kinds of aluminum alloys. Among the above-mentioned base materials, these resins are preferably applied to the piston 1 of the internal combustion engine, particularly to the thrust-side and counterthrust-side skirt portions 8, 9 of the piston 1 as explained in the embodiments.

An object to which the present invention can be applied is not limited to a piston for internal combustion engines. The present invention can be applied also to a case of forming a solid lubricant coating film on the surface of other sliding members.

EXPLANATION OF REFERENCE NUMERALS

1 Piston
1a Piston base member
3 Cylinder wall surface
8 Thrust-side skirt portion
9 Counterthrust-side skirt portion
21 Inner coating film
22 Outer coating film
30 Laser heating apparatus
31 Laser oscillator
31a-31f Laser oscillator
32 Glass-made diffusion panel
33 Laser beams

The invention claimed is:

1. A method for forming a multilayer solid lubricant coating film on an external surface of a skirt portion of a piston in an internal combustion engine, by comprising the steps of:
 preparing an inner solid lubricant coating film from a material containing at least graphite;
 applying the inner solid lubricant coating film on the external surface of the skirt portion, followed by irradiating the film with a laser beam to dry the film;
 applying an outermost layer solid lubricant coating film, followed by conducting a baking treatment thereon; and
 changing the energy density of the laser beam according to heat radiation of the skirt portion.

2. A method as claimed in claim 1, wherein the multilayer comprises a first solid lubricant coating film directly applied to the external surface of the skirt portion and a second solid lubricant coating film applied above the first solid lubricant coating film, a solid lubricant for the first solid lubricant coating film principally contains graphite, and a solid lubricant for the second solid lubricant coating film principally contains molybdenum disulfide.

3. A method as claimed in claim 2, wherein the first solid lubricant coating film and the second solid lubricant coating film contain, as a binder resin material, at least one kind of a polyimide resin and a polyamide-imide resin.

4. A method as claimed in claim 3, wherein the first solid lubricant coating film is set to have a solid lubricant content of less than 50 wt % while the second solid lubricant coating film is set to have a solid lubricant content of 50 to 95 wt %.

5. A method for forming a multilayer solid lubricant coating film on an external surface of a skirt portion of a piston in an internal combustion engine, comprising the steps of:
 preparing an inner solid lubricant coating film from a material containing a black-color component;
 applying the inner solid lubricant coating film on the skirt portion, followed by irradiating the film with a laser beam at a temperature rise rate of 11.3 to 23.9° C./second to dry the film;

applying an outermost layer solid lubricant coating film, followed by conducting a baking treatment thereon; and changing the energy density of the laser beam according to heat radiation of the skirt portion.

6. A method as claimed in claim 5, wherein the inner solid lubricant coating film is formed of a material containing graphite.

7. A method as claimed in claim 5, wherein the inner solid lubricant coating film is formed of a material containing carbon black.

8. A method as claimed in claim 5, wherein a period of time for the laser beam irradiation is 10 to 25 seconds.

9. A method for forming a solid lubricant coating film on a skirt portion of a piston in an internal combustion engine, comprising the steps of:

preparing a solid lubricant coating film from a material containing a black-color component;

applying the solid lubricant coating film on the skirt portion, followed by irradiating the solid lubricant coating film with a laser beam to cure the film;

increasing the energy density of the laser beam after a predetermined period of time for the laser beam irradiation; and changing the energy density of the laser beam according to heat radiation of the skirt portion.

10. A method as claimed in claim 9, wherein the energy density of the laser beam is conditioned to be low until the solid lubricant coating film is dried and that the energy density of the laser beam is increased after the solid lubricant coating film is dried.

11. A method as claimed in claim 10, wherein the temperature rise rate of the laser beam is kept at 11.3 to 23.9° C./second for 10 seconds from the start of the laser beam irradiation and that the temperature rise rate of the laser beam is adjusted to exceed 23.9° C./second after a lapse of 10 seconds from the start of the laser beam irradiation.

12. A method as claimed in claim 9, wherein the laser beam is applied by two or more laser oscillators and each of the laser oscillators is adjusted to be increased in energy density as heat radiation of a corresponding part of the skirt portion is increased.

13. A method as claimed in claim 12, wherein the energy density of the laser beam applied to the side of a crown portion which defines a combustion chamber is adjusted to become higher than that applied to the side of a crankshaft.

14. A method as claimed in claim 13, wherein the energy density of the laser beam applied to both end regions that the skirt portion has at its both end of the circumferential direction is adjusted to become higher than that applied to a central region that the skirt portion has at its center of the circumferential direction.

* * * * *